US005549036A

United States Patent [19]
Hourizadeh

[11] Patent Number: 5,549,036
[45] Date of Patent: Aug. 27, 1996

[54] CAPPUCCINO MAKING APPARATUS

[76] Inventor: Richard Hourizadeh, 5354 Quakertown, Woodland Hills, Calif. 91364

[21] Appl. No.: 518,992

[22] Filed: Aug. 24, 1995

[51] Int. Cl.⁶ .............................. A47J 31/42; A47J 31/36
[52] U.S. Cl. .............................. 99/286; 99/290; 99/302 R
[58] Field of Search .............................. 99/286, 290, 293, 99/294, 295, 289 R, 299, 300, 302 R, 316

[56] References Cited

U.S. PATENT DOCUMENTS 5,465,650  11/1995  Friedrich et al. .......................... 99/290
5,473,972  12/1995  Rizzuto et al. .......................... 99/290

*Primary Examiner*—Robert W. Jenkins
*Attorney, Agent, or Firm*—Gene Scott

[57] ABSTRACT

A cappuccino making apparatus having a coffee making unit and a separate milk preparation unit. The two units are housed within individual and separate cabinets and are connected by a set of liquid conduits that deliver milk from the milk unit to the coffee unit, this configuration thus allowing the units to be stored in different locations so as to maximize counter space. The coffee making unit can operate independently of the milk preparation unit, and when no milk is being dispensed by the coffee unit, the milk in the conduits is recirculated back to the milk unit so that stale milk is never dispensed by the coffee unit.

4 Claims, 3 Drawing Sheets

CAPPUCCINO MAKING APPARATUS

BACKGROUND OF THE INVENTION

1. Field of the Invention

This invention relates generally to cappuccino making machines and more particularly to a system and method for providing and serving coffee beverages such as espresso, cappuccino, cafe latte, etc. fully automatically while saving physical space of the device itself, as well as counter space where the device is located.

2. Description of Related Art

Coffee making devices are very common appliances, both in the household and in restaurant and industrial settings. However, these devices are typically capable only of brewing coffee, and are not equipped to make coffee drinks that require milk, such as cappuccino, espresso, cafe latte, etc. Thus, to properly make such drinks requires a special device with an internal refrigeration unit for storing the necessary milk. There are numerous different prior art devices designed to serve this function.

For example, Anderson et al. discloses an automated, milk inclusive espresso coffee machine which includes a fully automatic coffee grinding and brewing apparatus and a steam generator for driving a venturi mixing device which draws ambient air and milk from a refrigerated source for making milk inclusive espresso beverages, all milk contacting surfaces being either refrigerated or steam cleaned with each beverage made and served. A microprocessor controls all operations including brewing, steam generating, water heating, refrigerating, operations parameters, measuring and monitoring, many "house-keeping" functions and others.

Giuliano U.S. Pat. No. 4,779,519 discloses an emulsifier assembly for emulsifying air, steam and milk in preparing cappuccino and like beverages, particularly for use with bar-size espresso coffee makers, being also adapted for heating up milk in preparing cafe au lait, comprises a body, a steam delivery channel opening into a suction chamber of the body, an air intake line and a milk intake line. Both lines are in communication with the suction chamber, and a flow rate adjuster is connected in the air intake line. A before shutter member is operative in the air intake line, and a restrictor member is operative in and end section of the milk intake line.

Siccardi U.S. Pat. No. 4,922,810 discloses an automatic device for obtaining frothy milk. The device includes a first mixing assembly which feeds a second frothing assembly, comprising an expansion chamber, a milk feeding duct being provided in the first assembly inside a nozzle for the pressurized steam, this nozzle being coaxial to the milk duct, the outlet of this duct slightly projecting over the steam outlet. The milk-steam mixture flows to the expansion chamber, which has a circular section. Preferably the diameter of the nozzle of the out-flowing milk is about 1.1–1.2 mm, while the clear radial span of the annular section nozzle of the out-flowing steam is about 0.2 mm, the milk outlet projecting about 0.2 mm with respect to the steam outlet.

Oota U.S. Pat. No. 4,406,217 teaches a coffee maker with a mill mechanism, a drip mechanism and a control device. The control device contains a mill time setting counter for setting a milling time of coffee beans in the form of digital data, a drive circuit for driving the mill mechanism and a drive circuit for driving the drip mechanism. When a start signal is supplied to the control device, the mill mechanism is driven only for the milling time set. After the laps of the milling time, the drip mechanism is automatically actuated to brew coffee.

Wunderlin et al. U.S. Pat. No. 4,242,568 discloses a process and apparatus for the selective production of hot water and steam from a constantly operating heater and with the use of a water pump intermittently feeding a constant volume of water through a conduit toward the heater, the pump and the heater being operable at a first rate of pumping frequency and at a first level of temperature for the production of hot water at a first operating condition. A control arrangement is provided for establishing a second rate of pumping frequency at the pump less then the first rate and a second level of temperature at the hater greater than the first level for the production of steam at a second operating condition. Control switches permit switching from one operating condition to another, and a steam collector used in the production of the steam includes an actuator for the switches so that the operating conditions are switched from one to the other upon insertion of the steam collector into and removal from a support for the collector beneath an exit opening of the conduit.

Illy U.S. Pat. No. 4,484,515 discloses an automatic espresso coffee machine for brewing coffee from coffee pods placed in an extraction head or in a plurality of extraction heads and is characterized in that it comprises an electronic control system, including a microprocessor and memory means, which operate all the operations of the machine. In particular, the machine carries out a continuous control of the water temperature in a boiler in order to keep that temperature in a narrow range of a selected temperature. It also controls the volume of the hot water delivered to each extraction head to be within a narrow range of predetermined volume. The machine diagnoses itself for possible failures and depleted supplies by showing on a display in code the kind of failure or of needed supply, such as coffee.

Paoletti U.S. Pat. No. 4,715,274 discloses an emulsifier unit particularly for emulsifying steam and milk to prepare cappuccino. The device includes a steam delivery conduit in communication with a steam generator and opening into a suction chamber into which a milk delivery conduit is lead, said suction chamber being in communication with an emulsifying chamber provided with an outward dispensing opening.

Giannelli U.S. Pat. No. 4,970,948 discloses an automatic household-type machine of a kind which comprises a percolation chamber having an outlet conduit for dispensing the coffee percolate, a heated water storage boiler, a pump having its delivery side communicated with the boiler, and an electronic control device linked operatively to a timer for activating the pump for pre-set time periods, further comprises a heater plate carried on a machine base and a manually operated two-way valve mounted on the free end of the outlet conduit from the percolation chamber. Connected to respective outlets of the valve are a first conduit for dispensing espresso coffee and a second conduit extending cantilever-fashion over the plate and being adapted to dispense German coffee percolate.

However, because the prior art includes grinding, brewing, refrigerating, frothing and other such equipment in a single device, they are rather heavy and difficult to transport. They also have a relatively large and bulky size, and are thus not conveniently stored on a countertop or the like. In addition, due to their complexity, these prior an devices are generally rather expensive and require more frequent repair. Thus, there is a clear need for an improved device for making coffee drinks. Not only would such a device be lightweight, compact and relatively inexpensive, but it would also be housed in two separate enclosures so that the device is more easily stored for home use. The present invention fulfills these needs and provides further related advantages as described in the following summary.

SUMMARY OF THE INVENTION

The present invention is an cappuccino making machine. It provides a coffee making unit and a separate milk preparation unit. The two units are housed within individual and separate cabinets and are connected by a preferably flexible set of liquid conduits. The conduits deliver milk from the milk unit to the coffee unit, but when no milk is being dispensed by the coffee unit, the milk in the conduits is recirculated back to the milk unit so that stale milk is never dispensed by the coffee unit. Thus it is an object of the present invention to provide a pair of units, together making up a cappuccino machine. It is another object of the invention to provide a means whereby the two units are tied together or interconnected such that one of the units may be placed remotely with respect to the other of the units in order to enable efficient use of counter space. It is another object of the present invention to provide a means by which the two machines can be interconnected but still avoid the dispensing of stale milk created within the conduits interconnecting the units.

The instant invention makes having a cappuccino making machine more practical and possible for home use since counter space is minimized. The milk machine may, for instance be stored in a cupboard. The milk machine is compatible with many of the commercially available coffee machines and can thus be interconnected to them in order to provide a means for providing a source of fresh milk automatically within the cycles of the coffee machine.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a cappuccino making machine. In such drawings.

DETAILED DESCRIPTION OF THE PREFERRED EMBODIMENT

Figure 1:
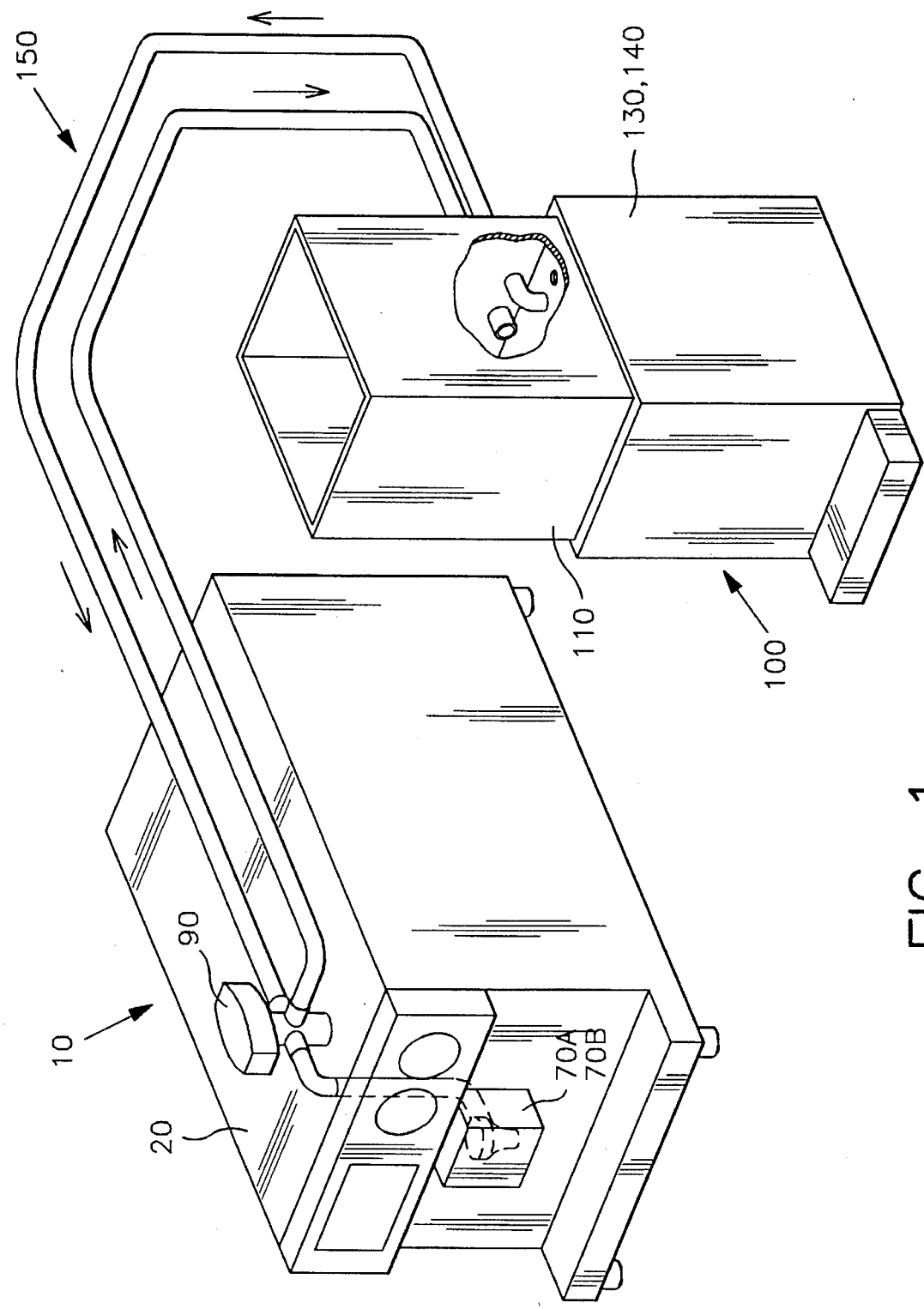
FIG. 1 is a perspective view of a first preferred embodiment of the present invention.
Figure 2:
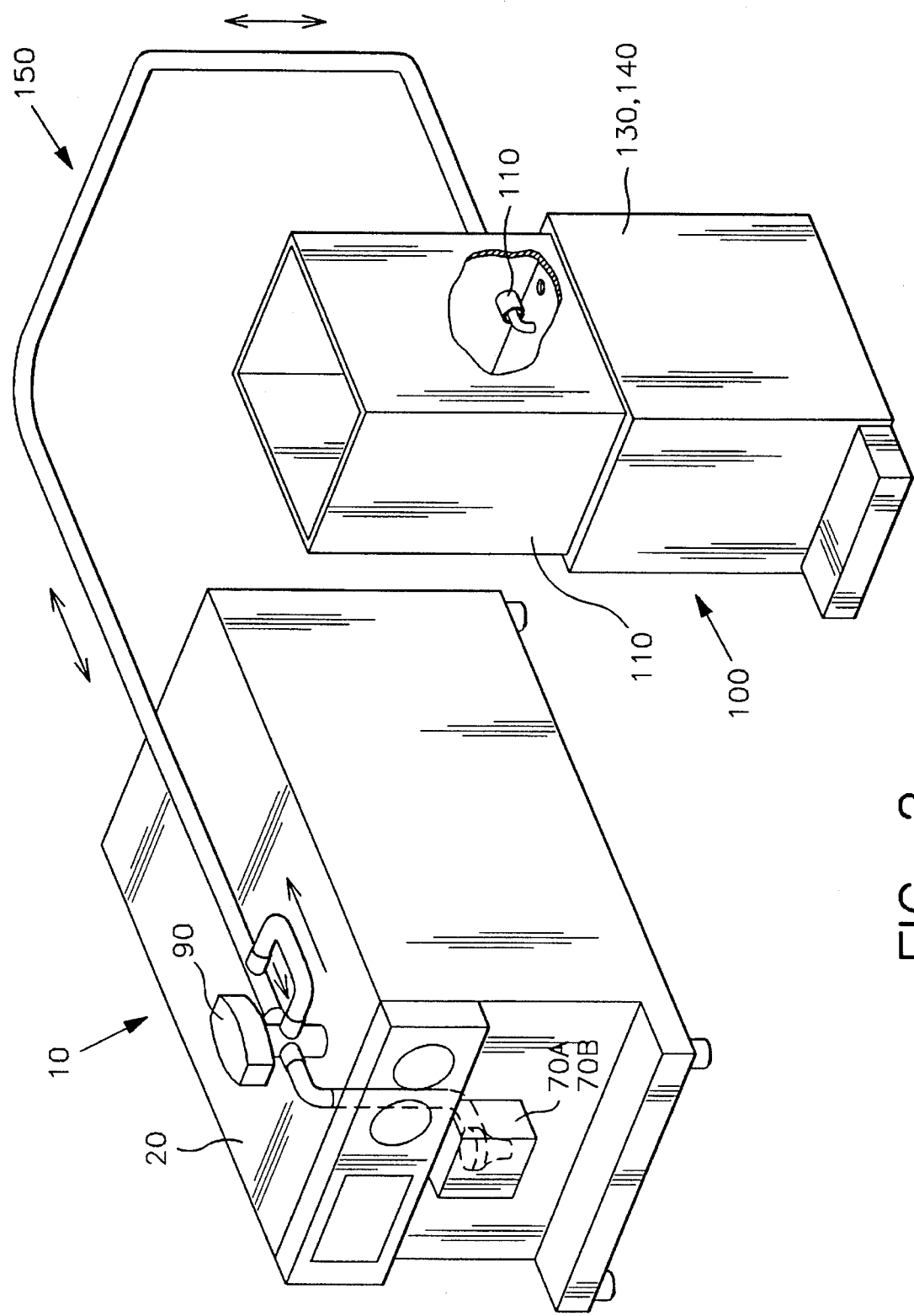
FIG. 2 is a perspective view of a second preferred embodiment of the present invention.
Figure 3:
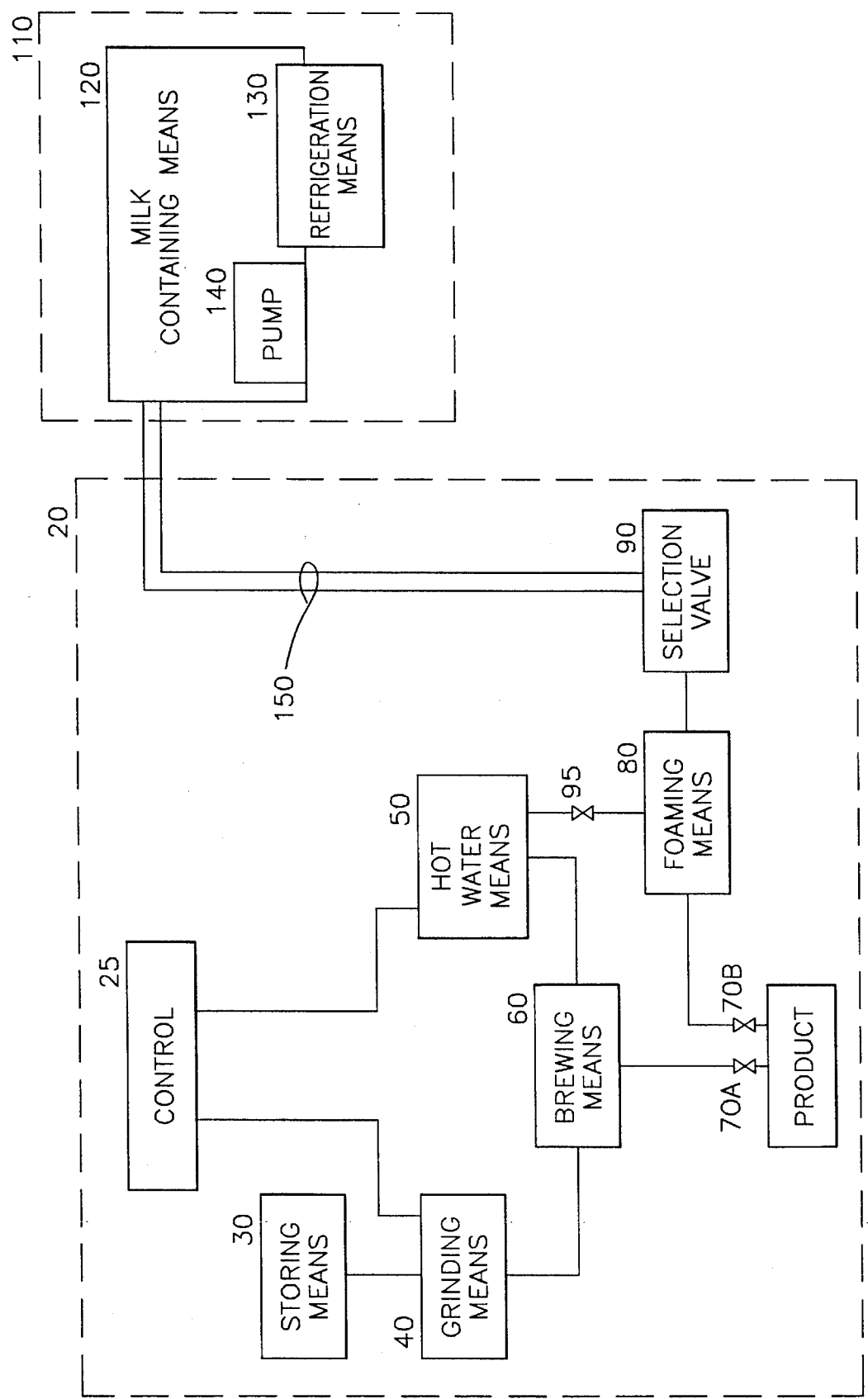
FIG. 3 is a block diagram of the present invention.

A cappuccino making apparatus is illustrated in FIGS. 1 and 2 of the drawings, and is represented in block diagram form in FIG. 3 of the drawings. The apparatus includes a coffee machine 10 in a first free standing enclosure 20. Within the enclosure 20 is the components necessary for making coffee. These include a means for storing a supply of coffee beans 30, such as a bean hopper, well known in the art. The hopper is interconnected with a means for grinding 40 of a measured amount of the coffee beans supplied from the hopper. The grinding means 40 is a coffee grinder of any type well known in the art. The machine 10 further includes a means for producing a supply of hot water 50 such as a water boiler well known in the art. The boiler 50 and grinder 40 both are interconnected with a means for brewing coffee 60 such as a coffee brewing chamber, well known in the art. The brewing means 60 is then further interconnected with a first dispensing valve 70A for dispensing the brewed coffee.

The coffee machine 10 further includes a means for foaming 80, interconnected with the hot water means 50, a selection valve 90 and a second dispensing valve 70B.

A separate milk machine 100 is enclosed in a second free standing enclosure 110, as shown in FIG. 1. The machine 100 includes a means for containing a supply of milk 120 which is cooled by a refrigeration means 130 coupled with the milk containing means 120. This arrangement enables the milk supply to be maintained at a selected temperature. A milk pumping means 140 is included for continuously pumping at least a portion of the milk supply. The milk supply is drawn from the milk containing means 120 through a milk delivery means 150. The milk delivery means joins the milk containing means 120 of the milk machine 100 with the selection valve 90 of the coffee machine 10. With the selection valve 90 in a first position, milk within the milk delivery means 150 is circulated back to the milk containing means 120 in order to maintain freshness in the milk within the milk delivery means 150.

With the selection valve 90 placed in a second position, milk from the milk delivery means 120 is diverted into the foaming means 80 and is foamed to a selected consistency. Subsequently the foamed milk is dispensed through the second dispensing valve 70B.

The apparatus may further include a sanitization valve 95 between the hot water producing means 50 and the foaming means 80 such that with the sanitization valve 95 in an open position, hot water is diverted through the foaming means 80, portions of the selection valve 90, and the second dispensing valve 70B, to remove milk residues from these parts. This approach permits the portions of the coffee machine which carry milk products, to remain free of rancid milk residues.

The milk delivery means 150 must be able to carry milk from the milk containing means 120 to the selection valve 90 over a potentially long un-refrigerated path. It is not acceptable that this path be a factor in the condition of the milk arriving at the selection valve 90. Thus the path is a complete circuit with the milk drawn from the containing means 120 flowing through the delivery means 150 and back to the containing means 120 continuously. In this way, when milk is called for, it is available immediately at the selection valve 90, is fresh, and is at a controlled temperature. To accomplish this, the delivery means 150, in a first embodiment, is a pair of flexible hoses of a length for permitting the milk machine 100 to be positioned remotely with respect to the coffee machine 10. In an alternate embodiment, the milk delivery means 150 is a coaxially arranged flexible hose of a length for permitting the milk machine to be positioned remotely to the coffee machine. The coffee machine may include a control device 25 such as a computer based control system, a mechanical timer or other well known cycle control devices. With such a control device 25, the preparation of a coffee batch is automatically managed, including the dispensing and grinding of an amount of coffee beans, the adding of hot water of a selected temperature, the brewing of the coffee, and dispensing of the coffee.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A cappuccino making apparatus comprising:

a coffee machine in a first enclosure and including a means for storing a supply of coffee beans, the storing means interconnected with a means for grinding a measured amount of the coffee beans, the machine further including a means for producing a supply of hot water, the hot water producing means and the grinding means both interconnected with a means for brewing coffee from the measured amount of coffee beans, and a measured amount of the supply of hot water, the brewing means further interconnected with a first dispensing valve for dispensing the brewed coffee;

the coffee machine further including a means for foaming, interconnected with the hot water means, a selection valve and the first dispensing valve;

a milk machine in a second enclosure and including a means for containing a supply of milk, a refrigeration means coupled with the milk containing means for maintaining the milk supply at a selected temperature, and a milk pumping means for continuously pumping, at least a portion of the milk supply, drawn from the milk containing means, through a milk delivery means joining the milk supply means of the milk machine with the selection valve of the coffee machine, such that with the selection valve in a first position, milk within the milk delivery means is circulated back to the milk containing means in order to maintain freshness in the milk within the milk delivery means;

the selection valve positionable into a second position wherein milk from the milk delivery means is diverted into the foaming means, is foamed therein, and is subsequently dispensed through a second dispensing valve.

2. The apparatus of claim 1 further including a sanitization valve between the hot water producing means and the foaming means such that with the sanitization valve in an open position, hot water is diverted through the foaming means, portions of the selection valve, and the second dispensing valve, to remove milk residues therefrom.

3. The apparatus of claim 1 wherein the milk delivery means is a pair of flexible hoses of a length for permitting the milk machine to be positioned remotely to the coffee machine.

4. The apparatus of claim 1 wherein the milk delivery means is a coaxially arranged flexible hose of a length for permitting the milk machine to be positioned remotely to the coffee machine.

* * * * *